Figure 1:
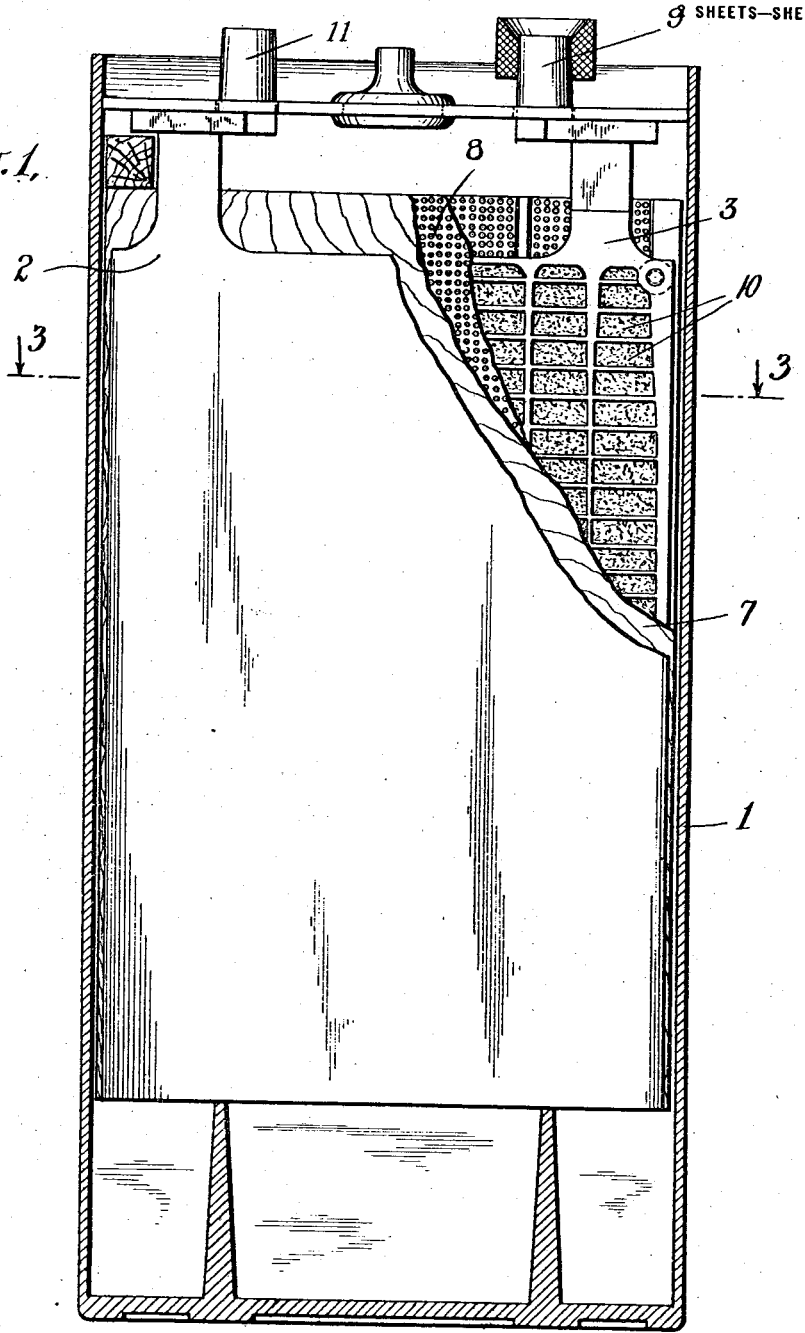

R. N. CHAMBERLAIN.
STORAGE BATTERY CELL.
APPLICATION FILED MAR. 23, 1914.

1,141,526.

Patented June 1, 1915.
9 SHEETS—SHEET 1.

WITNESSES
John P. Templer
George Schlatt

INVENTOR,
Rufus N. Chamberlain,
BY
Kenyon & Kenyon,
his ATTORNEYS

R. N. CHAMBERLAIN.
STORAGE BATTERY CELL.
APPLICATION FILED MAR. 23, 1914.
1,141,526.
Patented June 1, 1915.
2 SHEETS—SHEET 2.
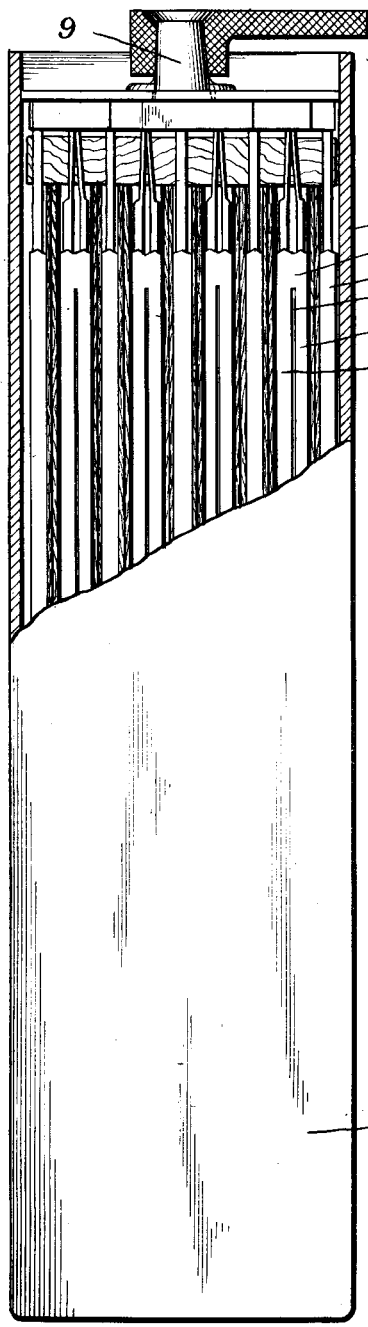
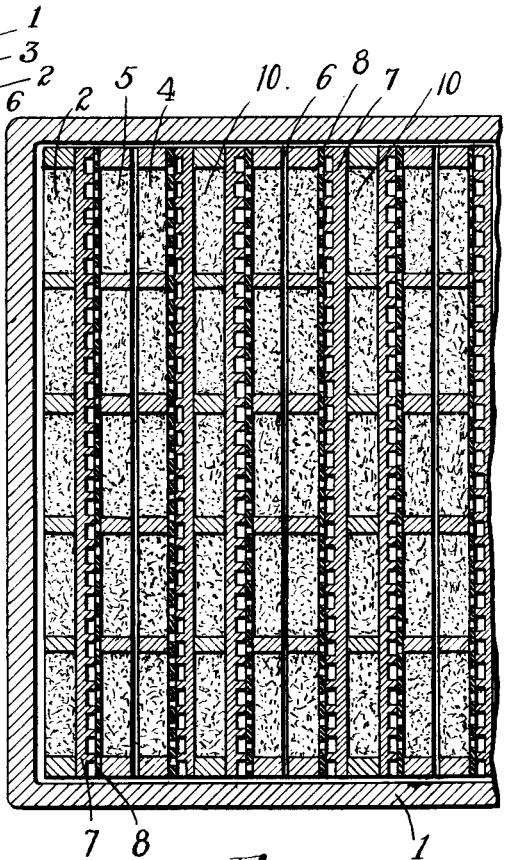

UNITED STATES PATENT OFFICE.

RUFUS N. CHAMBERLAIN, OF CHICAGO, ILLINOIS, ASSIGNOR TO GOULD STORAGE BATTERY COMPANY, A CORPORATION OF NEW YORK.

STORAGE-BATTERY CELL.

1,141,526.　　　　Specification of Letters Patent.　　Patented June 1, 1915.

Application filed March 23, 1914. Serial No. 826,534.

*To all whom it may concern:*

Be it known that I, RUFUS N. CHAMBERLAIN, a citizen of the United States, and a resident of the city of Chicago, county of Cook, and State of Illinois, have invented certain new and useful Improvements in Storage-Battery Cells, of which the following is a specification.

My invention relates to storage batteries and has for its object an increase in capacity of the battery for a given size and weight of cell and a reduction of the number of parts necessary in former cells.

I have found that in the usual storage battery cell the capacity of the cell is limited by the capacity of the positive elements of the cell. I have found also that the capacity of the positive elements can be much increased by constructing the positive with an internal chamber or chambers thereby bringing the active material on the inside of the positive into direct surface contact with electrolyte. One type of such plate is illustrated and the method of making the same is described in the patent to Chamberlain and Hall No. 1,075,897, and another type of such plate and the method of producing it are set out in my pending application, Serial No. 824,599 filed March 14, 1914.

It is immaterial to my present invention what particular method of construction of the positive plates be employed and it is sufficient, to illustrate a specific embodiment thereof, to assume that the positive plates, according to my present invention, are made in accordance with the disclosure of the said Chamberlain and Hall patent. My present invention, however, involves the employment of positives of the general type above described with negatives of ordinary construction. By employing positives of the type set forth, *i. e.*, with internal chambers, and negatives of the ordinary type, I am enabled to provide elements of substantially equal capacity and so use all the materials to the best advantage, while at the same time maintaining the necessary mechanical strength of the negatives. By the above arrangement the number of battery separators is reduced, as compared with a cell of given capacity of the old type, and as the present standard practice is to use a wood separator and a rubber sheet between each positive and negative element, the expense and the space saved are considerable. I am therefore enabled to utilize considerable space which has heretofore been wasted, and which is due to the saving of the number of separators required. In the present arrangement, the plates are so arranged that each negative, except the two outside ones, coöperates with two positives.

My invention will be more fully understood by reference to the following description taken in connection with the accompanying drawings which illustrate one specific embodiment of my invention, and in which—

Figure 1 shows a side view of a cell partly in section; Fig. 2 shows a transverse partly sectional view, and Fig. 3 shows a horizontal section on the line 3—3 of Fig. 1.

In the drawings, 1 represents the usual containing vessel in which is placed the negative plates 2 and the positive plates 3. These plates are separated by separators composed of the wood members 7 and perforated rubber sheets 8. It will be noticed from Fig. 2, particularly, that the positive plates 3, in effect, comprise two elements 4 and 5. These elements constitute a cast grid in which is placed material 10 which may be either active material or material adapted to be rendered active. The positive plates are connected in the usual manner to the terminal 9 and the negatives to the terminal 11.

By reference to Fig. 3 the arrangement of the plates will be more clearly understood, and this arrangement is as follows: First a negative 2, then a separator 7—8, then a double positive 3, having the elements 4 and 5, then a separator, a negative, etc. From this it will be seen that each interior negative coöperates with two positives. By this arrangement it is possible to reduce the number of plates necessary for a given number of couples, and consequently the number of separators will be reduced, and the space which would ordinarily be occupied by these separators can be utilized for useful material. It may be stated that by this arrangement a cell is obtained which has a plurality of positive elements in combination with a less number of negatives so that the differences between the total number of elements and the number of couples equals the total number of the negative elements. That is to say, in a cell having four couples there will be four positives and three negatives, so that the difference between the total number of elements, which is 7, and the number of couples, which is 4, will equal the number of negatives, which is 3. This rule will hold good in a cell having any number of couples. Another way of stating the rule would be that in a cell of this character the difference between the total number of elements and the number of couples increases in an arithmetic progression—that is to say, in a cell having 6 couples there will be 10 elements, the difference between the couples and the elements being 4. In a cell having 8 couples there will be 13 elements, the difference between the elements and couples being 5. In a cell having 10 couples there will be 16 elements, the difference between the elements and the couples being 6, and so on, increasing by one each time.

Having described my invention, what I claim as new and desire to secure by Letters Patent is:—

1. In a storage battery cell, a group of positives, each having internal spaces adapted to place interior active material in direct communication with electrolyte and a group of negatives, each directly exposed to electrolyte only on its outside.

2. In a storage battery cell, a plurality of plate elements of substantially the same thickness, each positive consisting of two of said elements united mechanically and electrically but with an internal chamber between them in direct communication with the electrolyte, and each negative consisting of but one of said elements.

3. In a storage battery cell, a plurality of positive elements in combination with a less number of negative elements so that the difference between the total number of elements and the number of couples equals the total number of negative elements.

4. In a storage battery cell, a plurality of positive elements in combination with a plurality of negative elements so that the difference between the total number of elements and the number of couples increases in an arithmetic progression.

5. In a storage battery cell, the combination of a plurality of both positive and negative elements, each negative element, except two, being adapted to coöperate with all the active material of two positive elements.

In testimony whereof, I have signed my name to this specification, in the presence of two subscribing witnesses.

RUFUS N. CHAMBERLAIN.

Witnesses:
 FREDK. E. E. BOOSS,
 M. R. SHEDD.